(No Model.)
G. CARGIN.
THILL COUPLING.
No. 534,995. Patented Mar. 5, 1895.
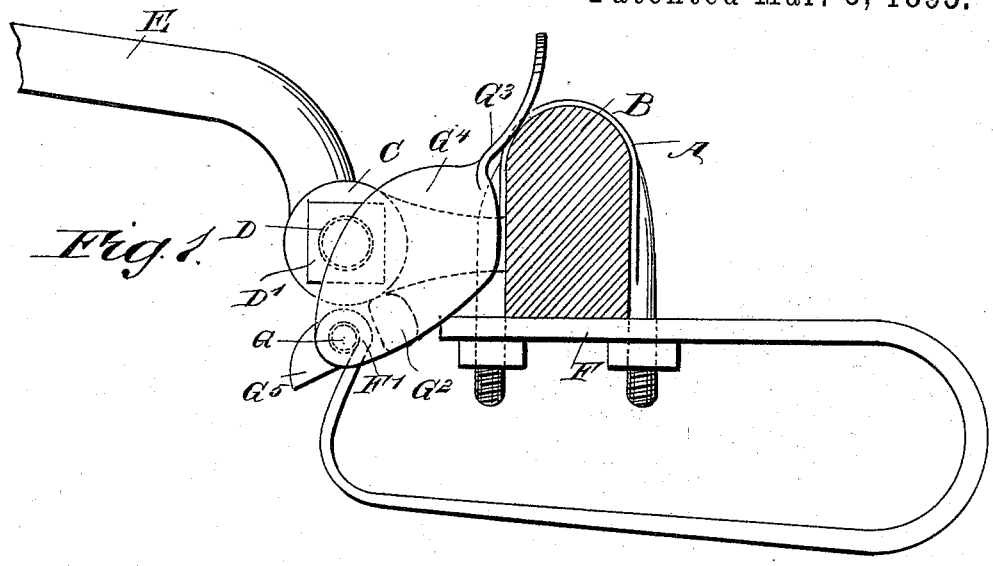
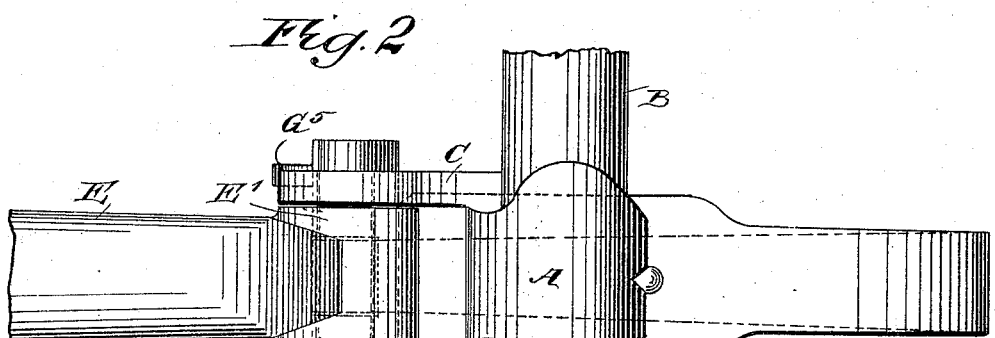
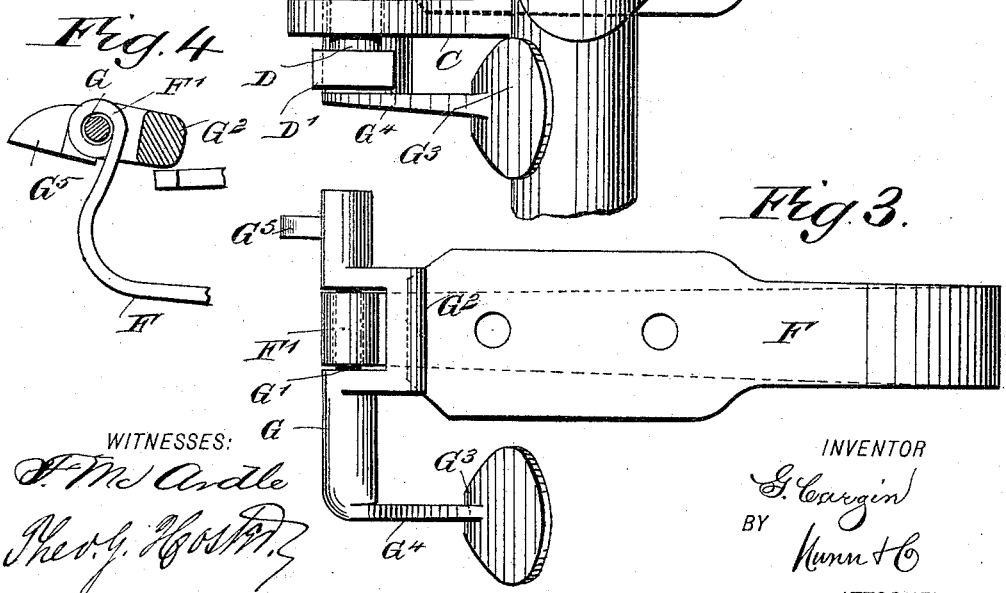
WITNESSES:
INVENTOR
G. Cargin
BY
Nunn & Co
ATTORNEYS.

UNITED STATES PATENT OFFICE.

GEORGE CARGIN, OF WELLS, NEW YORK.

THILL-COUPLING.

SPECIFICATION forming part of Letters Patent No. 534,995, dated March 5, 1895.

Application filed March 19, 1894. Serial No. 504,214. (No model.)

*To all whom it may concern:*

Be it known that I, GEORGE CARGIN, of Wells, in the county of Hamilton and State of New York, have invented a new and Improved Thill-Coupling, of which the following is a full, clear, and exact description.

The object of the invention is to provide a new and improved thill coupling, which is simple and durable in construction, and arranged to permit of quickly changing the pole or thills of vehicles, and to prevent rattling and accidentally losing the pivot pin.

The invention consists principally of a spring held on the thill clip, and carrying in its free end a shaft provided with a projection adapted to engage the eye of the shaft or pole, and a handle on said shaft and adapted to extend across the pivot pin for the thill coupling.

The invention also consists of certain parts and details, and combinations of the same, as will be fully described hereinafter and then pointed out in the claims.

Reference is to be had to the accompanying drawings, forming a part of this specification, in which similar letters of reference indicate corresponding parts in all the figures.

Figure 1 is a side elevation of the improvement with the axle in section. Fig. 2 is a plan view of the same. Fig. 3 is a plan view of the spring and the shaft carried thereby; and Fig. 4 is a sectional side elevation of the same.

The clip A is secured, in the usual manner, on the axle B, and is provided with the arm C carrying the pivot pin D engaging the eye E' of the shaft or pole E. The clip plate F is formed into a spring extending rearward and curved downward, to then extend forward and then upward, the free end F' of the spring forming a bearing for the reduced part G' of a transversely extending shaft G mounted to turn in the said bearing F'.

On the shaft G is formed a projection $G^2$ adapted to engage the eye E' of the shaft or pole, so as to prevent the latter from rattling in its bearing, as will be readily understood by reference to Fig. 1. On one outer end of the shaft G is secured a handle $G^3$ adapted to normally rest with its free end on the axle B, as is plainly indicated in Figs. 1 and 2. This handle $G^3$ is formed with a widened part $G^4$ extending across the head D' of the pivot pin D, so as to prevent the said pivot pin from becoming accidentally displaced, as the widened part $G^4$ prevents lateral movement of the said pin.

On the inner end of the shaft G is formed a limiting stop $G^5$ adapted to abut against the corresponding bearing C, so as to limit the turning movement of the shaft G at the time the operator throws the handle $G^3$ forward and downward to bring the widened part $G^4$ out of alignment with the pin D. This latter movement is necessary whenever the operator desires to change the pole or thills, as the pivot pin D can then be withdrawn to disengage the eye E' from the bearing C on the clip. At the same time the projection $G^2$ is released from the eye E', so that the pin D can be readily withdrawn.

It is understood that when the several parts are in working position, as shown in Figs. 1 and 2, then the spring of the clip plate F causes its free end F' to press the shaft G and its projection $G^2$ in contact with the eye E' of the pole or thill, to prevent rattling. When the operator throws the handle $G^3$ forward and downward, the shaft G turns in its bearing F' in the free end of the spring, and as the free end gives or swings downward by the projection $G^2$ riding on the under side of the eye E', it finally releases the said projection $G^2$ from the eye E', so that the pin D can be withdrawn.

Having thus fully described my invention, I claim as new and desire to secure by Letters Patent—

1. A thill coupling provided with a spring, a shaft journaled in the free end of the said spring and provided with a projection adapted to engage the eye of the pole or shaft, and a handle held on the said shaft and adapted to extend across the head of the pin, to prevent the latter from becoming accidentally detached, substantially as shown and described.

2. A thill coupling comprising a clip having a clip plate formed into a spring, and a shaft journaled in the free end of the said spring and provided with a projection adapted to engage the eye of the pole or shaft, substantially as shown and described.

3. A thill coupling comprising a clip having a clip plate formed into a spring, a shaft journaled in the free end of the said spring and provided with a projection adapted to engage the eye of the pole or shaft, and a handle held on the said shaft and provided with a widened part extending across the pivot pin head, to prevent the latter from becoming accidentally detached, substantially as shown and described.

4. A thill coupling comprising a clip having a clip plate formed into a spring, a shaft journaled in the free end of the said spring and provided with a projection adapted to engage the eye of the pole or shaft, a handle held on the said shaft and provided with a widened part extending across the pivot pin head, to prevent the latter from becoming accidentally detached, and a limiting stop adapted to engage one of the bearings of the clip to limit the movement of the shaft, substantially as shown and described.

GEORGE CARGIN.

Witnesses:
JOHN BABCOCK,
CARL L. FRY.